(12) United States Patent
Liu et al.

(10) Patent No.: US 8,023,229 B2
(45) Date of Patent: Sep. 20, 2011

(54) FLEXIBLE MOUNTING SLIDER WITH ANTI-STATIC STRUCTURE, HEAD GIMBAL ASSEMBLY AND MAGNETIC DISK DRIVE WITH THE SAME

(75) Inventors: Yan Liu, Dongguan (CN); HaiTing Li, Dongguan (CN); ZhaoYu Teng, Dongguan (CN); XingHong Li, Dongguan (CN); Sidney Chou, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 879 days.

(21) Appl. No.: 12/068,244

(22) Filed: Feb. 4, 2008

(65) Prior Publication Data

US 2008/0186611 A1    Aug. 7, 2008

(30) Foreign Application Priority Data

Feb. 7, 2007   (CN) .......................... 2007 1 0005137

(51) Int. Cl.
*G11B 21/21* (2006.01)
*G11B 17/32* (2006.01)
*G11B 5/60* (2006.01)

(52) U.S. Cl. .................. 360/234.5; 360/245.9; 360/246

(58) Field of Classification Search ............... 360/234.3, 360/234.4, 234.5, 245.8, 245.9, 246, 128, 360/323
See application file for complete search history.

(56) References Cited

U.S. PATENT DOCUMENTS 4,761,699 A * 8/1988 Ainslie et al. .............. 360/234.5

FOREIGN PATENT DOCUMENTS

| CN | 1329740 | 1/2002 |
| CN | 1825433 | 8/2006 |

* cited by examiner

*Primary Examiner* — Craig A. Renner
*Assistant Examiner* — Gustavo Polo
(74) *Attorney, Agent, or Firm* — Nixon & Vanderhye PC (57) ABSTRACT

A flexible mounting slider with anti-static structure includes a slider body, an anti-static structure and a lead layer. The slider body includes an ABS, a slider back surface opposite to the ABS and a trailing edge connected with the ABS and the slider back surface. The trailing edge forms a plurality of slider pads thereon. The anti-static structure is provided on the slider back surface, which includes an insulation plate formed on the slider back surface, an anti-static plate formed on the insulation plate and a grounding element. In the invention, the anti-static plate comprises an insulation layer and an anti-static layer. The grounding element is electrically contacting with the anti-static layer of the anti-static plate and the slider back surface simultaneously. The lead layer is sandwiched between the insulation plate and the insulation layer of the anti-static plate and electrically connected with the slider pads of the slider body.

12 Claims, 6 Drawing Sheets

FLEXIBLE MOUNTING SLIDER WITH ANTI-STATIC STRUCTURE, HEAD GIMBAL ASSEMBLY AND MAGNETIC DISK DRIVE WITH THE SAME

This application claims priority to Chinese Application No. 200710005137.6 filed Feb. 7, 2007, the entire contents of which are hereby incorporated by reference.

FIELD OF THE INVENTION

The present invention generally relates to an information recording disk drive device, and more particularly to a flexible mounting slider (FMS) with anti-static structure for avoiding or weakening the harmful impact of static electricity on write/read element during the assembly process of the magnetic disk drive.

BACKGROUND OF THE INVENTION

Disk drives are information storage devices that use magnetic media to store data and movable read/write elements positioned over the magnetic media to selectively read data from and write data to the magnetic media.

Figure 1A:
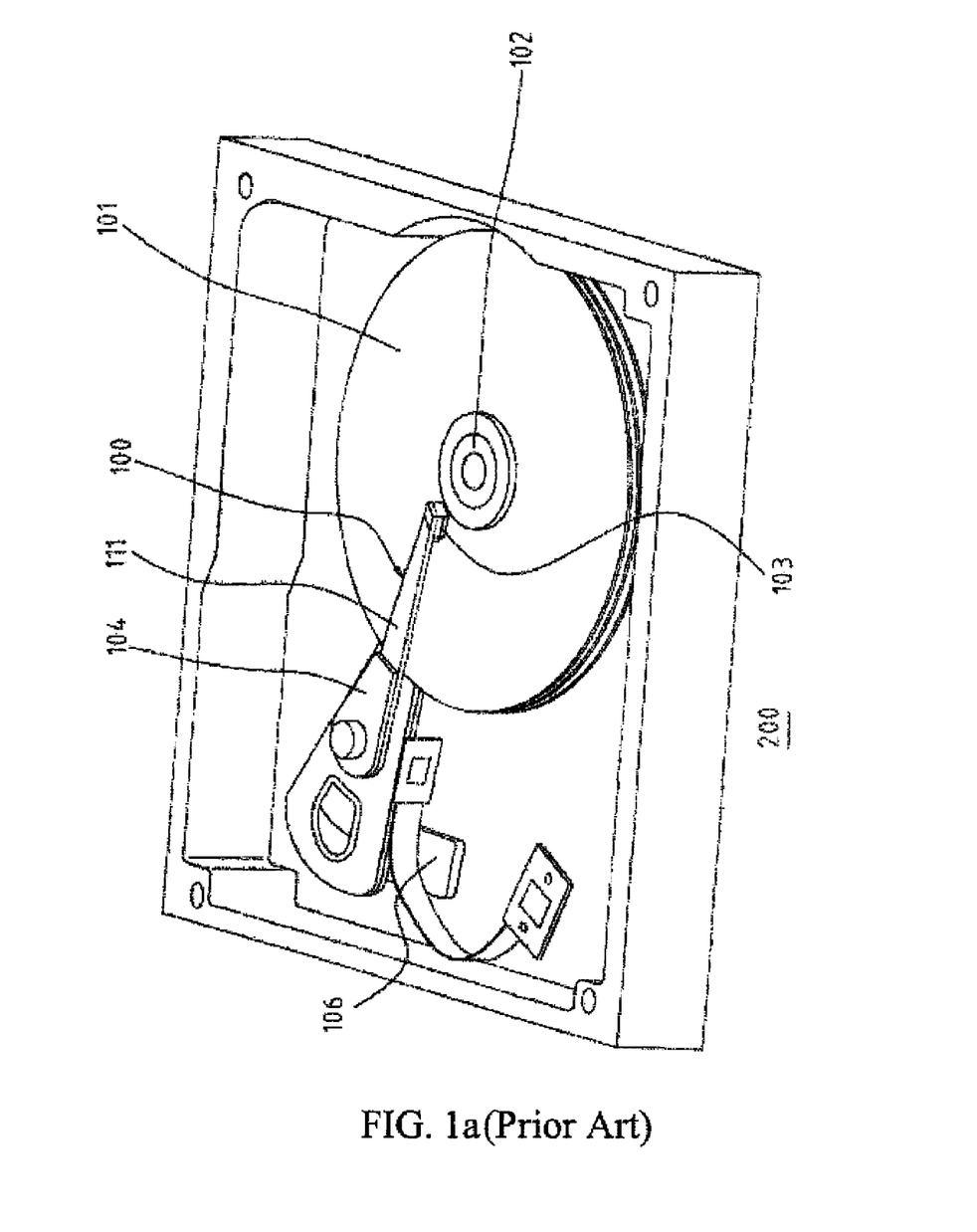
FIG. 1a is a perspective view of a conventional disk drive device.
Figure 1B:
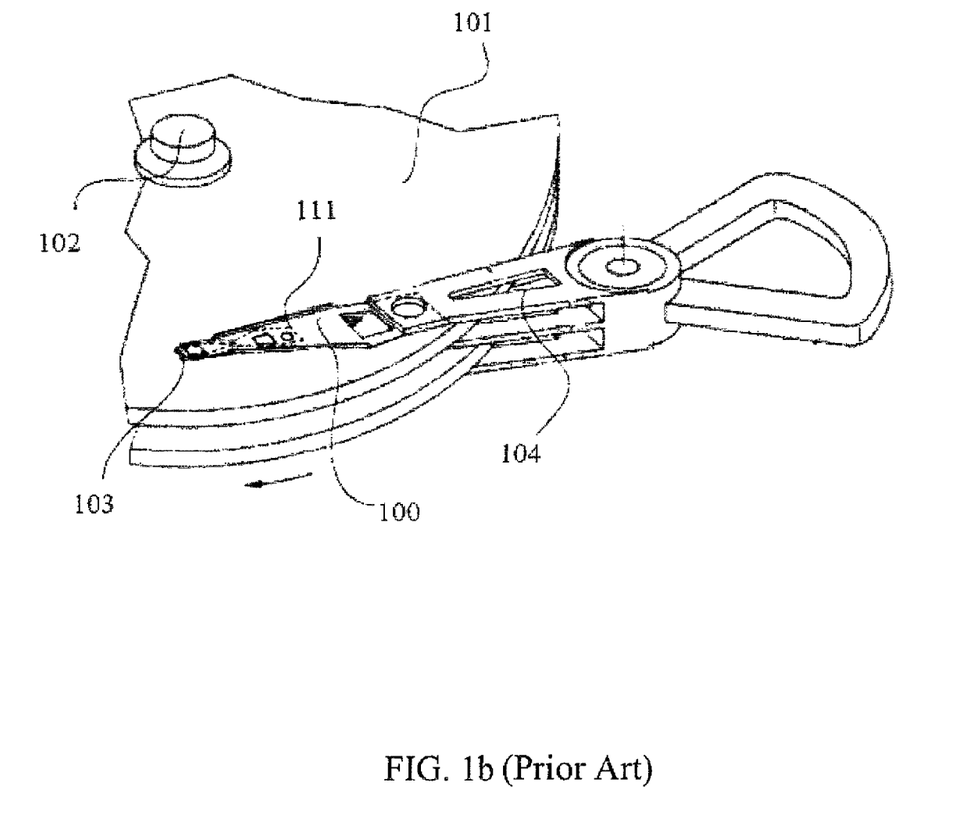

FIGS. 1a-1b illustrate a conventional disk drive device 200. As shown in the figures, a disk 101 is mounted on a spindle motor 102 for spinning the disk 101. A voice-coil motor (VCM) arm 104 carries a head gimbal assembly (HGA) 100. The HGA 100 includes a suspension 111 and a slider 103 mounted on a tail end of the suspension 111. The slider 103 embeds read/write elements (not shown) therein to realize data read/write operation of the slider 103 relative to the disk 101. A voice-coil motor 106 is provided for controlling the motion of the voice-coil motor arm 104 and in turn, controlling the slider 103 to move across the surface of the disk 101 from track to track, thereby realizing data read/write operation of the read/write elements relative to the disk 101. In operation, a lift force is generated by the aerodynamic interaction between the slider 103 incorporating read/write elements and the spinning disk 101. The lift force is opposed by equal and opposite spring force applied by the suspension 111 of HGA 100 such that a predetermined flying height of the slider 103 above the surface of the spinning disk 101 is maintained over a full radial stroke of the voice-coil motor arm 104.

Figure 1C:
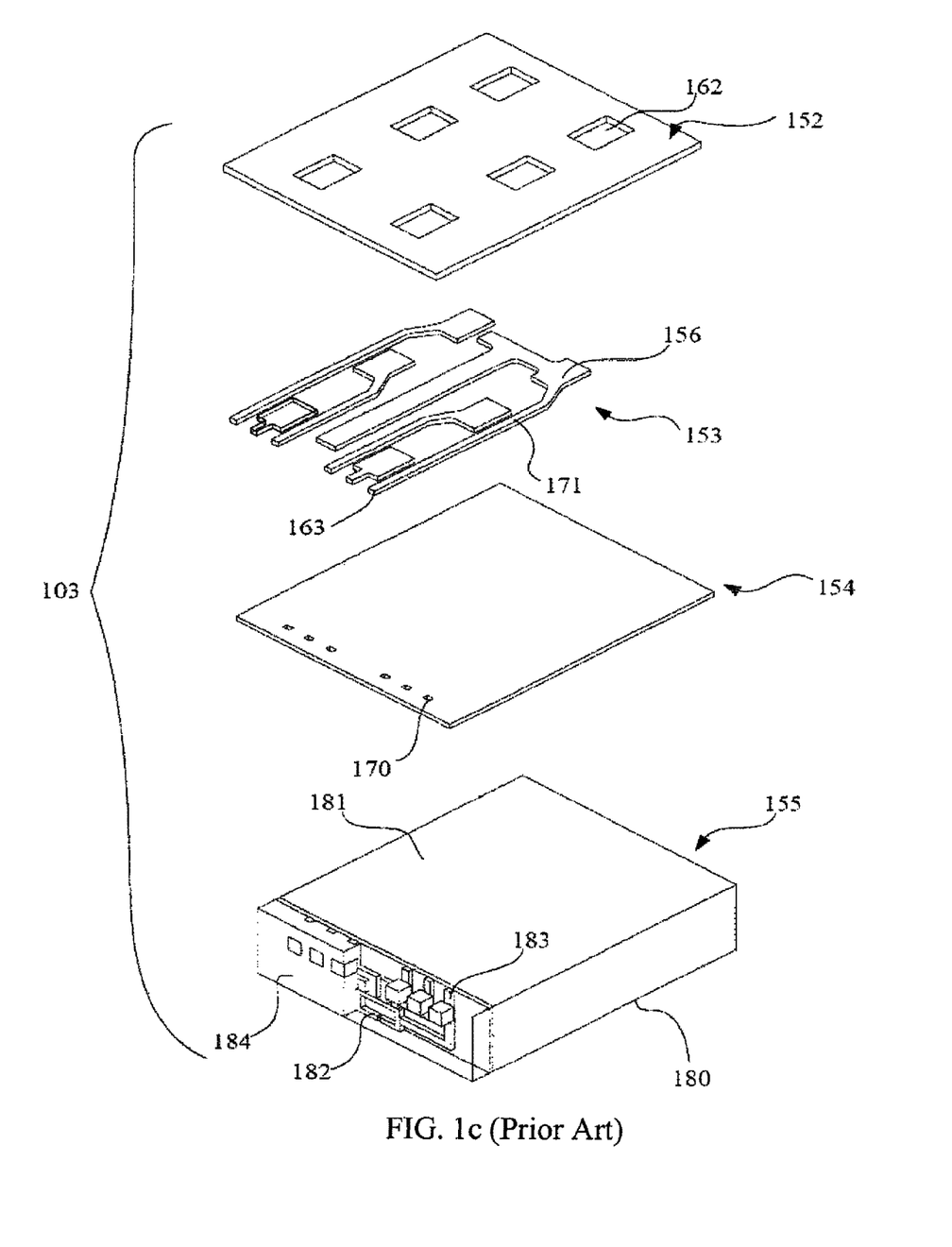
FIG. 1c is an exploded, perspective view of a flexible mounting slider of the conventional disk drive device shown in FIGS. 1a-1b.

FIG. 1c illustrates the slider 103 shown in FIGS. 1a-1b. The slider 103 is a flexible mounting slider (FMS), which could simplify the assembly process of HGA and the whole disk drive device, and thus has been widely used. As shown in FIG. 1c, the flexible mounting slider 103 includes a slider body 155, a first insulation layer 154 formed on the slider body 155, a lead layer 153 formed on the first insulation layer 154 and a second insulation layer 152 formed on the lead layer 153.

The slider body 155 has an air bearing surface (ABS) 180 and a slider back surface 181 opposite to the ABS 180. A trailing edge 184 is formed on the slider body 155 to connect with the ABS 180 and the slider back surface 181, which is provided with read elements (not shown) and write elements 182 thereon. The trailing edge 184 forms a plurality of slider pads 183 at a position close to the slider back surface 181. In the invention, the slider pads 183 electrically connect with the read/write elements.

The first insulation layer 154 is formed to cover the slider back surface 181 so as to form an electrical insulation layer between the lead layer 153 and the slider body 155. The first insulation layer 154 forms a plurality of openings 170 at positions corresponding to the slider pads 183 of the slider body 155. The lead layer 153 comprises a plurality of leads 171 electrically isolated from each other. One end of each lead 171 forms a first pads 163 corresponding to the slider pad 183, the other end of each lead 171 forms a second pad 156 adapted to electrically connect with the suspension (shown as numeral 111 of FIG. 1b). The lead layer 153 is formed on the first insulation layer 154 and insulated from the slider body 155. The slider pads 183, the openings 170 and the first pads 163 are positioned correspondingly, and the slider pads 183 and the corresponding first pads 163 could pass through the opening 170 and thus electrically connecting with each other.

The second insulation layer 152 is used to form an electrical insulation layer between the lead layer 153 and the suspension (not shown). The second insulation layer 152 forms a plurality of openings 162 at positions thereof corresponding to the second pads 156 of the lead layer 153. The second pads 156 could pass through the opening 162 and thus electrically connect with the corresponding electrical connection pads (not shown) of the suspension via the electrical connection ball.

Because of the existence of the two insulation layers, the read/write elements of the slider 103 could achieve electrical connection with the corresponding parts of the suspension via the slider pads 183 with the lead layer 153. However, in the slider-forming process, because the second insulation layer 152 is provided at the outermost surface of the slider 103, it is very easy for the second insulation layer 152 to rub with the outside surroundings, thus accumulating a large amount of electrostatic charges. Because of the electrostatic induction action, some electrostatic charges are also distributed in the lead layer 153, which makes the lead layer 153 present high potential accordingly. As the second insulation layer 152 has no proper grounding structure, the electrostatic charges are unable to be released before the slider 103 is assembled to the other components. For such reason, during the process of assembling the slider 103 to the other components, it is very easy for the lead layer 153 to contact with the low-potential outside surroundings (such as operators' hands, clamps, etc.), thus generating electrostatic discharge (ESD) which will cause the current flow through the slider read/write elements connected with the lead layer 153, thereby damaging the slider read/write elements.

It is therefore desirable to provide an improved flexible mounting slider to overcome the above disadvantages of the prior art.

SUMMARY OF THE INVENTION

Accordingly, a main object of the present invention is to provide a flexible mounting slider (FMS) with anti-static structure to avoid or weaken the harmful impact of electrostatic discharge (ESD) on the write/read elements during the slider assembling process, thus ensuring the safety of the slider assembling process.

Another object of the present invention is to provide a HGA with the above-mentioned flexible mounting slider (FMS) to avoid or weaken the harmful impact of electrostatic discharge (ESD) on the write/read elements during the HGA assembly process, thus ensuring the safety of the assembling process.

A further object of the present invention is to provide a disk drive unit with the above-mentioned flexible mounting slider (FMS) to avoid or weaken the harmful impact of electrostatic discharge (ESD) on the write/read elements during the assembly process of disk drive unit, thus ensuring the safety of the assembling process.

To achieve the above-mentioned objects, the present invention provides a flexible mounting slider (FMS) with anti-static structure. The flexible mounting slider comprises a slider body, an anti-static structure and a lead layer. The slider body includes an air bearing surface (ABS), a slider back surface opposite to the ABS and a trailing edge connected with the ABS and the slider back surface. The trailing edge forms a plurality of slider pads thereon. The anti-static structure is provided on the slider back surface. The anti-static structure includes an insulation plate formed on the slider back surface, an anti-static plate formed on the insulation plate, and a grounding element. In the invention, the anti-static plate comprises an insulation layer and an anti-static layer. The grounding element is electrically contacting with the anti-static layer of the anti-static plate and the slider back surface simultaneously. The lead layer is sandwiched between the insulation plate and the insulation layer of the anti-static plate and electrically connected with the slider pads of the slider body.

As an embodiment of the present invention, a surface resistivity of the anti-static plate is 0-1.0E11Ω, a volume resistivity of the anti-static plate is 0-1.0E10Ω·cm. The anti-static layer of the anti-static plate and the grounding element are made of semiconductor material (e.g. diamond-like carbon material) or metal material for providing a good electrostatic draining performance. Preferably, a thickness of the anti-static layer of the anti-static plate is 1 nm-100 nm.

The anti-static plate forms a contact hole running through the insulation layer and the anti-static layer. A through hole is formed in the insulation plate. In the invention, one end of the grounding element passes through the contact hole to contact with the anti-static layer, the other end of the grounding element passes through the through hole to contact with the slider back surface. The insulation plate forms a plurality of openings at positions corresponding to the slider pads of the slider body. The lead layer comprises a plurality of leads each of which includes a first pad and a second pad connected with the first pad. The first pad passes through the corresponding opening to electrically connect with the corresponding slider pad. The anti-static plate forms a plurality of openings correspond to the second pads of the leads, which are running through the insulation layer and the anti-static layer.

A head gimbal assembly (HGA) comprises a suspension and a flexible mounting slider (FMS) provided on the suspension. The flexible mounting slider comprises a slider body, an anti-static structure and a lead layer. The slider body includes an air bearing surface (ABS), a slider back surface opposite to the ABS and a trailing edge connected with the ABS and the slider back surface. The trailing edge forms a plurality of slider pads thereon. The anti-static structure is provided on the slider back surface. The anti-static structure includes an insulation plate formed on the slider back surface, an anti-static plate formed on the insulation plate, and a grounding element. In the invention, the anti-static plate comprises an insulation layer and an anti-static layer. The grounding element is electrically contacting with the anti-static layer of the anti-static plate and the slider back surface simultaneously. The lead layer is sandwiched between the insulation plate and the insulation layer of the anti-static plate and electrically connected with the slider pads of the slider body.

A disk drive unit includes a HGA, a drive arm connected to the HGA, a disk and a spindle motor to spin the disk. The HGA comprises a suspension and a flexible mounting slider (FMS) provided on the suspension. The flexible mounting slider comprises a slider body, an anti-static structure and a lead layer. The slider body includes an air bearing surface (ABS), a slider back surface opposite to the ABS, and a trailing edge connected with the ABS and the slider back surface. The trailing edge forms a plurality of slider pads thereon. The anti-static structure is provided on the slider back surface. In the invention, the anti-static plate comprises an insulation layer and an anti-static layer. The grounding element is electrically contacting with the anti-static layer of the anti-static plate and the slider back surface simultaneously. The lead layer is sandwiched between the insulation plate and the insulation layer of the anti-static plate and electrically connected with the slider pads of the slider body.

In comparison with the prior art, as the anti-static plate of the anti-static structure has the anti-static layer, and the anti-static layer contacts with the slider body via the grounding element. Therefore, before assembling the slider to the other components, electrostatic charges produced in the slider fabricating process can be released via grounding the conductive anti-static layer, thereby avoiding electrostatic charge during the slider assembling process make a harmful effect on or damage the slider read/write elements.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 1b is a partial, perspective view of the conventional disk drive device shown in FIG. 1a;

FIG. 2b is an assembled perspective view of the flexible mounting slider with anti-static structure shown in FIG. 2a;

DEREARED DESCRIPTION OF ILLUSTRATED EMBODIMENTS

Figure 2A:
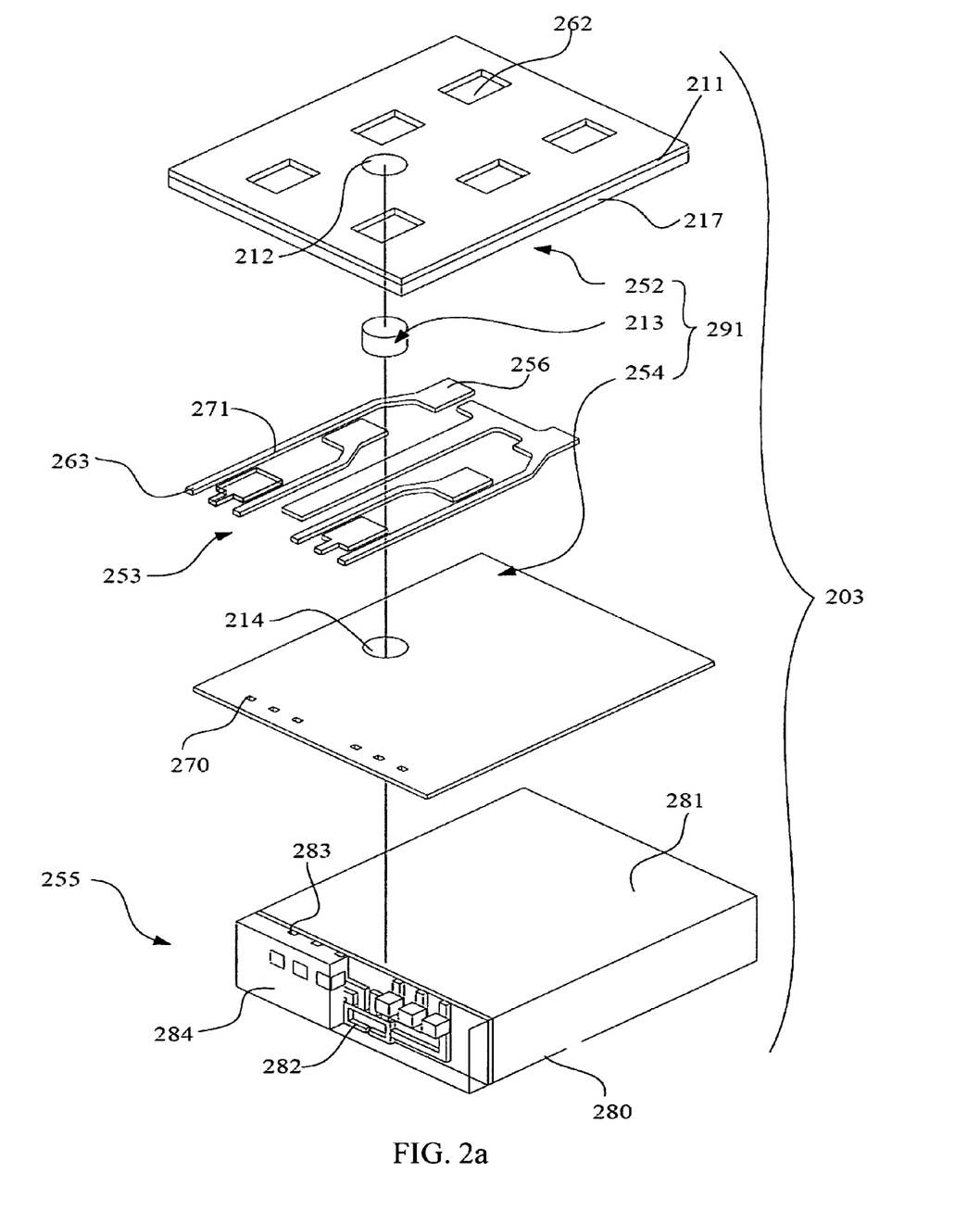
FIG. 2a is an exploded, perspective view of a flexible mounting slider with anti-static structure according to an embodiment of the present invention.
Figure 2B:
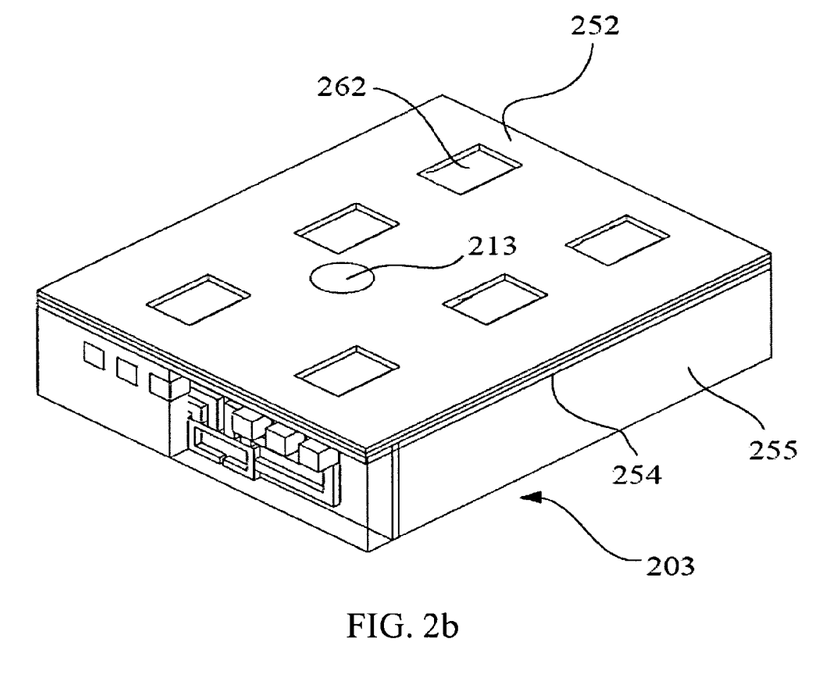

Various preferred embodiments of the invention will now be described with reference to the figures, wherein like reference numerals designate similar parts throughout the various views. FIG. 2a-2b shows a flexible mounting slider (FMS) 203 having an anti-static structure according to an embodiment of the present invention. The flexible mounting slider 203 includes a slider body 255, an anti-static structure 291 formed on the slider body 255 and a lead layer 253 in the anti-static structure 291.

The slider body 255 includes an air bearing surface (ABS) 280 for producing an aerodynamic interaction with a disk (such as the disk 201 shown in FIG. 4) and a slider back surface 281 opposite to the ABS 280. The slider back surface 281 is used for assembling the slider body 255 to the suspension (such as the suspension 251 shown in FIG. 3). The slider body 255 further has a trailing edge 284 to connect with the ABS 280 and the slider back surface 281. The trailing edge 284 provides read elements (not shown) for reading data recorded in the disk and write elements 282 for writing data into the disk. The trailing edge 284 forms a plurality of, e.g. six slider pads 283 at a position close to the slider back surface 281. In the invention, the slider pads 283 connect with the read/write elements.

Referring to FIG. 2a, the anti-static structure 291 includes an insulation plate 254 formed on the slider back surface 281, an anti-static plate 252 formed on the insulation plate 254, and a grounding element 213. In the invention, the anti-static plate 252 comprises an insulation layer 217 and an anti-static layer 211. The grounding element 213 electrically contacts with the anti-static layer 211 of the anti-static plate 252 and the slider back surface 281 simultaneously.

Figure 3:
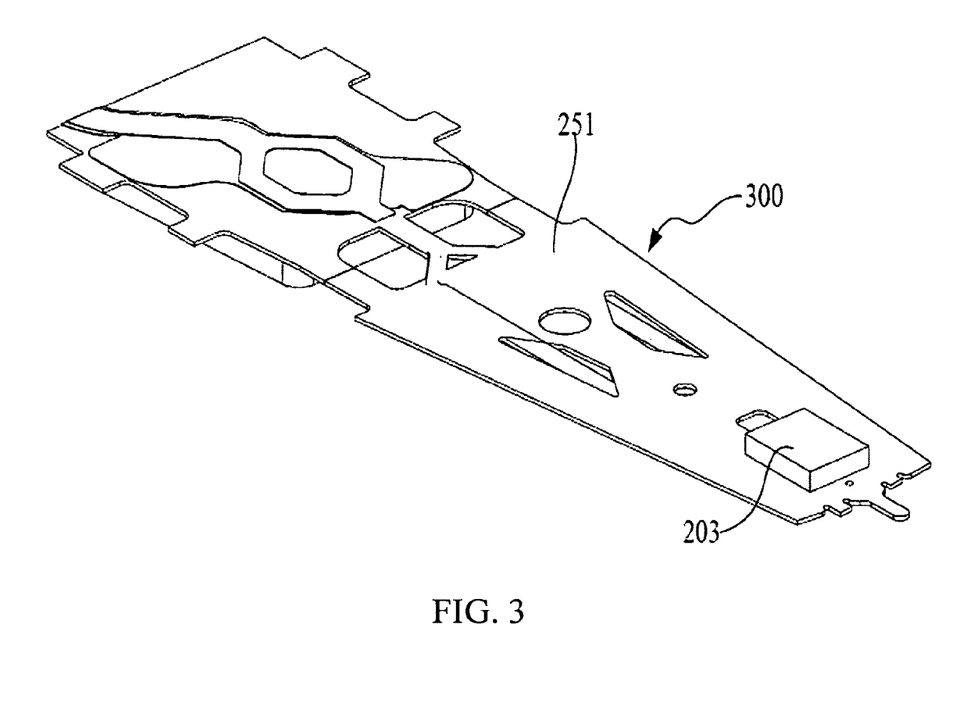
FIG. 3 is a perspective view of a HGA according to an embodiment of the present invention.

Referring to FIG. 2a-3, the insulation plate 254 forms a plurality of openings 270 at positions corresponding to the slider pads 283 of the slider body 255. The anti-static plate 252 forms a plurality of openings 262 each of which is running through the insulation layer 217 and the anti-static layer 211 thereof. The lead layer 253 is sandwiched between the insulation plate 254 and the insulation layer 217 of the anti-static plate 252 and electrically connected with the slider pads 283 of the slider body 255 for realizing electrical connection between the slider body 255 and peripheral elements (not shown). The lead layer 253 comprises a plurality of leads 271 insulated from each other (only one lead shown). One end of each lead 271 forms a first pad 263 corresponding to the slider pad 283, the other end of each lead 271 forms a second pad 256 for electrically connecting with the suspension (such as the suspension 251 shown in FIG. 3). The position of the second pads 256 are corresponding to the position of the opening 262 of the anti-static plate 252. The first pads 263 extend through the opening 270 of the insulation plate 254 and electrically connect with the corresponding slider pad 283. A kind of proper material, such as electrical connection ball is utilized on each of the second pads 256 for extending through the opening 262, and thus connects with the suspension (such as the suspension 251 shown in FIG. 3). By means of the electrical connection between the first pads 263 and the slider pads 283, and the electrical connection between the second pads 256 and the suspension, an electrical connection between the slider body 255 and the suspension is thus established.

Specifically, as shown in FIGS. 2a-2b, a contact hole 212 is formed in the anti-static plate 252, which is running through the insulation layer 217 and the anti-static layer 211. Also, a through hole 214 is formed in the insulation plate 254. In the present invention, one end of the grounding element 213 extends through the contact hole 212 and thus electrically contacts with the anti-static layer 211. The other end of the grounding element 213 extends through the through hole 214 and thus electrically contacts with the slider back surface 281. In the present invention, the grounding element 213 is used to electrically connect the anti-static layer 211 with the conductive slider body 255. Therefore, before assembling the flexible mounting slider 203 to the other components (such as suspension), electrostatic charges produced in the slider fabricating process can be released via grounding the conductive anti-static layer 211, thereby avoiding electrostatic charge produced during the slider assembling process to make a harmful impact on or damage the slider read/write elements.

In other words, in the present invention, the grounding element 213 is utilized to electrically connect the anti-static plate 252 with the slider body 255, thus electrostatic charges accumulated in the slider body 255 during slider fabricating process could be released by grounding the anti-static layer 211 before the slider 203 is assembled to the other components.

The anti-static layer 211 of the anti-static plate 252 is made of suitable anti-static material, such as semiconductor (e.g. diamond-like carbon material) or metal material. A thickness of the anti-static layer 211 of the anti-static plate 252 is preferably 1 nm-100 nm. In addition, a surface resistivity of the anti-static layer 211 of the anti-static plate 252 is 0-1.0E11Ω, a volume resistivity of the anti-static layer 211 of the anti-static plate 252 is 0-1.0E10Ω·cm. It has been tested that the slider body 255 could not only achieve a good anti-static performance, but also not affect the data read/write operation of the slider body 255 when the anti-static materials having the above technical parameter is used in the invention.

Besides, the grounding element 213 could be formed in various fitting forms, such as cylinder, and the grounding element 213 could be made of semiconductor material (e.g. diamond-like carbon material) or metal material for providing a good grounding performance. In addition, the grounding element 213 is also can be formed by directly perfusing proper semiconductor material or metal material into the space formed by the contact hole 212 of the anti-static plate 252, the through hole 214 of the insulation plate 254 and the slider back surface 281 of the slider body 255.

FIG. 3 shows a HGA 300 having the flexible mounting slider 203 with the anti-static structure 291. The HGA 300 includes a suspension 251 and a flexible mounting slider 203 provided on the suspension 251.

Figure 4:
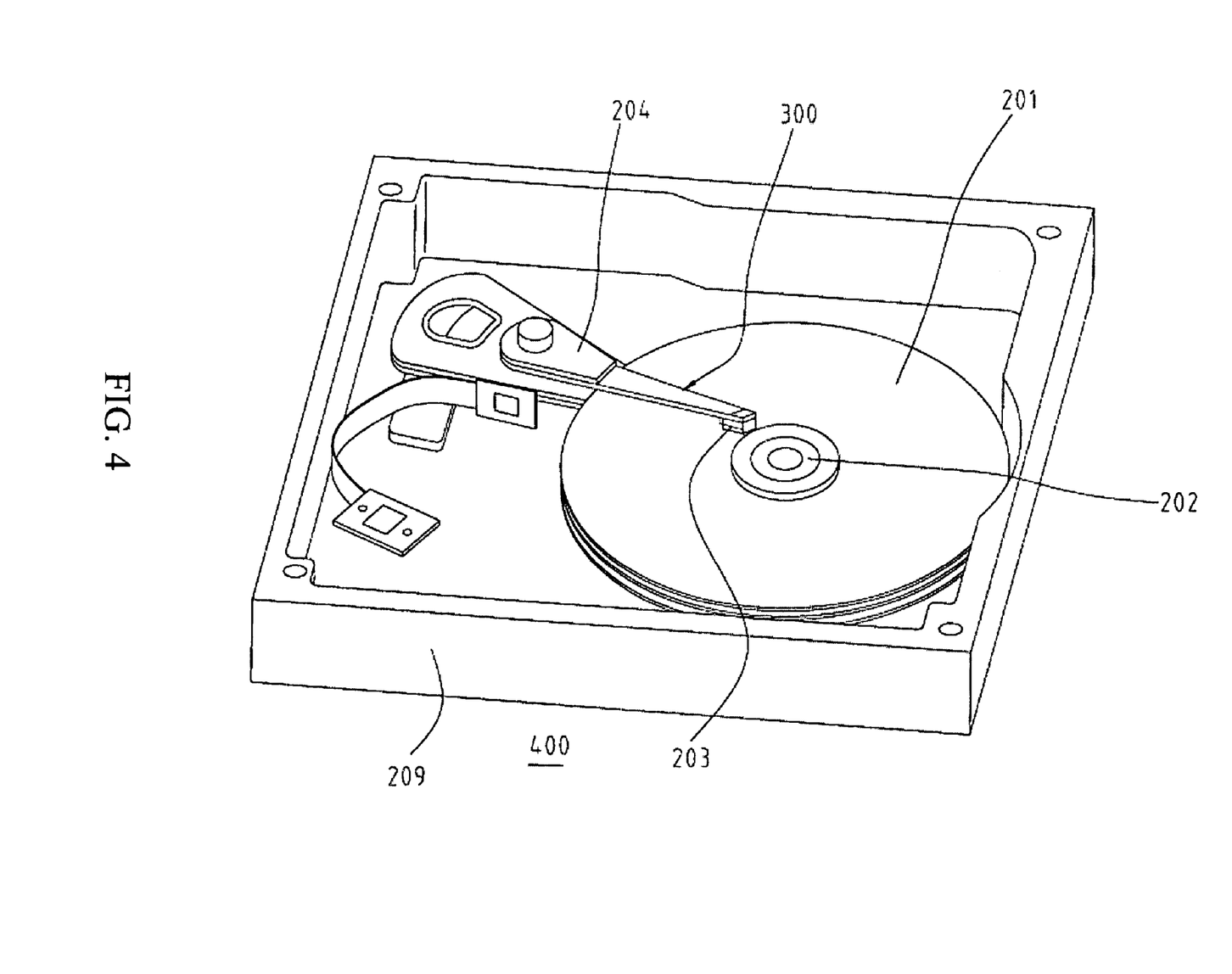
FIG. 4 is a perspective view of a disk drive device according to an embodiment of the present invention.

FIG. 4 shows a disk drive unit 400 according to an embodiment of the invention. The disk drive unit 400 includes a HGA 300 having the flexible mounting slider 203 with the anti-static structure 291, a drive arm 204 connected to the HGA 300, a disk 201, a spindle motor 202 to spin the disk 201 and a housing 209 to contain the components above-mentioned. As the structure, working process and assembly process of the disk drive unit are well known to persons ordinarily skilled in the art, a detailed description is omitted herefrom.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A flexible mounting slider with anti-static structure, comprising:
    a slider body, the slider body including an air hearing surface, a slider back surface opposite to the air bearing surface, and a trailing edge connected with the air bearing surface and the slider back surface, said trailing edge forming a plurality of slider pads thereon;
    an anti-static structure provided on the slider back surface; which comprises:
        an insulation plate formed on the slider back surface,
        an anti-static plate formed on the insulation plate; and
        a grounding element; wherein the anti-static plate comprising an insulation layer and an anti-static layer, the grounding element electrically contacting with the anti-static layer of the anti-static plate and the slider back surface simultaneously; and
    a lead layer, the lead layer sandwiched between the insulation plate and the insulation layer of the anti-static plate and electrically connected with the slider pads of the slider body;
    wherein the insulation plate forms a plurality openings at positions corresponding to the slider pads of the slider body, the lead layer comprises a plurality of leads each of which includes a first pad and a second pad connecting with the first pad, the first pad passes through the corresponding opening and electrically connects with the corresponding slider pad, the anti-static plate forms a plurality of openings running through the insulation layer and the anti-static layer, and the openings correspond to the second pads of the leads.

2. The flexible mounting slider according to claim 1, wherein a surface resistivity of the anti-static plate is 0-1.0E11Ω, and a volume resistivity of the anti-static plate is 0-1.0E10Ω·cm.

3. The flexible mounting slider according to claim 1, wherein the anti-static layer and the grounding element of the anti-static plate are made of semiconductor material or metal material.

4. The flexible mounting slider according to claim 1, wherein a thickness of the anti-static layer of the anti-static plate is 1 nm-100 nm.

5. The flexible mounting slider according to claim 3, wherein the semiconductor material is diamond-like carbon material.

6. The flexible mounting slider according to claim 1, wherein a contact hole is formed in the anti-static plate which runs through the insulation layer and the anti-static layer, and a through hole is formed in the insulation plate, one end of the grounding element passes through the contact hole to contact with the anti-static layer, the other end of the grounding element passes through the through hole to contact with the slider back surface.

7. A head gimbal assembly, comprising
a suspension; and
a flexible mounting slider provided on the suspension, wherein the flexible mounting slider comprises:
   a slider body, the slider body including an air bearing surface, a slider back surface opposite to the air bearing surface and a trailing edge connected with the air bearing surface and the slider back surface, the trailing edge forming a plurality of slider pads thereon;
   an anti-static structure provided on the slider back surface; which comprises;
      an insulation plate formed on the slider back surface,
      an anti-static plate formed on the insulation plate; and
      a grounding element; wherein the anti-static plate comprising an insulation layer and an anti-static layer, the grounding element electrically contacting with the anti-static layer of the anti-static plate and the slider back surface simultaneously; and
   a lead layer, the lead layer sandwiched between the insulation plate and the insulation layer of the anti-static plate and electrically connected with the slider pads of the slider body;
   wherein the insulation plate forms a plurality of openings at positions corresponding to the slider pads of the slider body, the lead layer comprises a plurality of leads each of which includes a first pad and a second pad connecting with the first pad, the first pad passes through the corresponding opening and electrically connects with the corresponding slider pad, the anti-static plate forms a plurality of openings running through the insulation layer and the anti-static layer, and the openings correspond to the second pads of the leads.

8. The head gimbal assembly according to claim 7, wherein a surface resistivity of the anti-static plate is 0-1.0E11Ω, and a volume resistivity of the anti-static plate is 0-1.0E10Ω·cm.

9. The head gimbal assembly according to claim 7, wherein a contact hole is formed in the anti-static plate which runs through the insulation layer and the anti-static layer thereof, and a through hole is formed in the insulation plate, one end of the grounding element passes through the contact hole to contact with the anti-static layer, the other end of the grounding element passes through the through hole to contact with the slider back surface.

10. The head gimbal assembly according to claim 7, wherein a thickness of the anti-static layer of the anti-static plate is 1 nm-100 nm.

11. A disk drive unit, comprising:
a head gimbal assembly;
a drive arm connected to the head gimbal assembly;
a disk; and
a spindle motor to spin the disk;
wherein the head gimbal assembly comprises a suspension and a flexible mounting slider provided on the suspension, the flexible mounting slider with anti-static structure comprising;
   a slider body, the slider body including an air bearing surface, a slider back surface opposite to the air bearing surface and a trailing edge connected with the air bearing surface and the slider back surface, the trailing edge forming a plurality of slider pads thereon;
   an anti-static structure provided on the slider back surface; which comprises:
      an insulation plate formed on the slider back surface,
      an anti-static plate formed on the insulation plate; and
      a grounding element; wherein the anti-static plate comprising an insulation layer and an anti-static layer, the grounding element electrically contacting with the anti-static layer of the anti-static plate and the slider back surface simultaneously; and
   a lead layer, the lead layer sandwiched between the insulation plate and the insulation layer of the anti-static plate and electrically connected with the slider pads of the slider body;
   wherein the insulation plate forms a plurality of openings at positions corresponding to the slider pads of the slider body, the lead layer comprises a plurality of leads each of which includes a first pad and a second pad connecting with the first pad, the first pad passes through the corresponding opening and electrically connects with the corresponding slider pad, the anti-static plate forms a plurality of openings running through the insulation layer and the anti-static layer, and the openings correspond to the second pads of the leads.

12. The disk drive unit according to claim 11, wherein a surface resistivity of the anti-static plate is 0-1.0E11Ω, and a volume resistivity of the anti-static plate is 0-1.0E10Ω·cm.

* * * * *